United States Patent Office 3,763,097
Patented Oct. 2, 1973

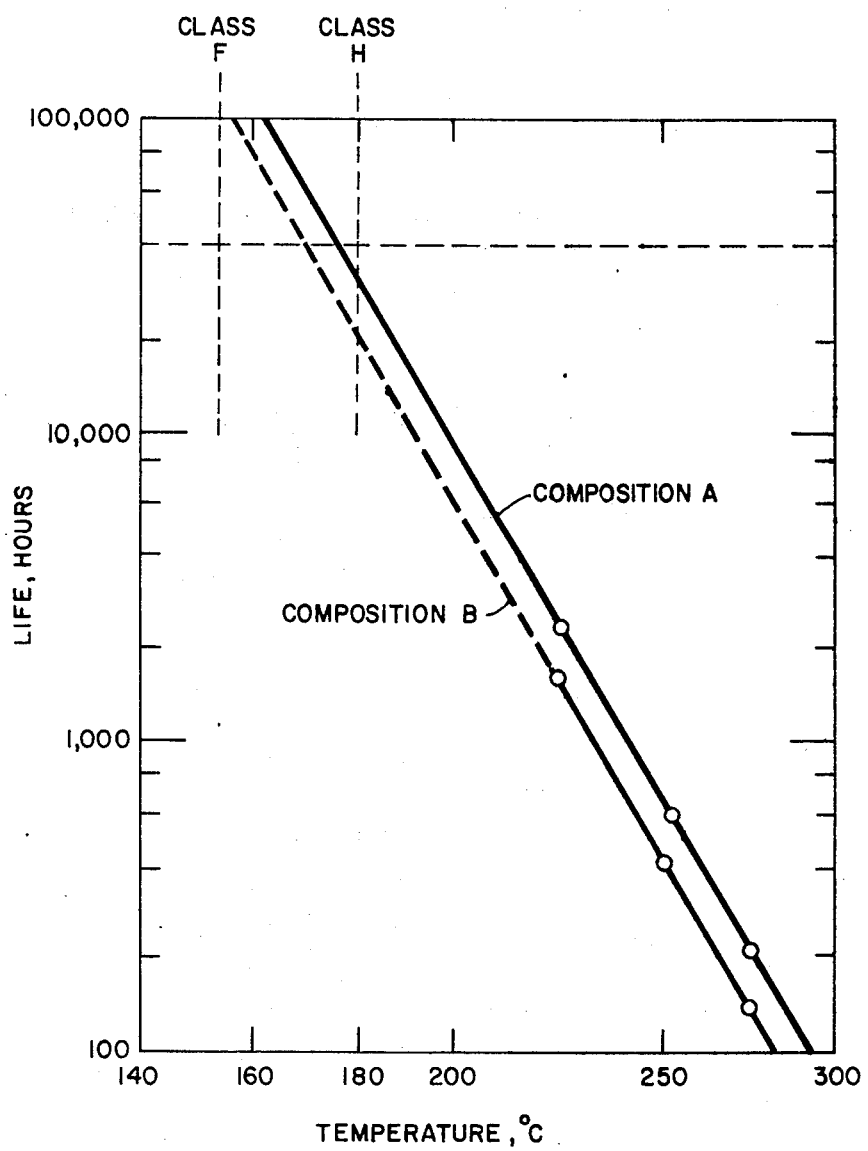

3,763,097
POLYETHER RESINS PREPARED FROM A DI-
EPOXIDE AND A TRIS(2-HYDROXYETHYL)
ISOCYANURATE
Leonard E. Edelman, Pittsburgh, Pa., assignor to Westing-
house Electric Corporation, Pittsburgh, Pa.
Filed Nov. 16, 1971, Ser. No. 199,151
Int. Cl. C08g 30/04
U.S. Cl. 260—47 EP
17 Claims

ABSTRACT OF THE DISCLOSURE

Polyether resins are made by reacting a cyclic diepoxide with a tris(2-hydroxyethyl) isocyanurate at an acid pH. The acid pH is preferably obtained by the use of a mild acid such as butyl acid phosphate. The reaction is complete after about 1½ to 10 hours at about 160 to 220° C.

BACKGROUND OF THE INVENTION

Polyether resins may generally be prepared by reacting diepoxides with compounds having at least two hydroxyl groups. But efforts to produce polyether resins by reacting a diepoxide with tris(2-hydroxyethyl)isocyanurate have resulted instead in the decomposition of the tris(2 - hydroxyethyl) isocyanurate to N-substituted 2-oxazolidones.

SUMMARY OF THE INVENTION

I have discovered that cyclic diepoxides can be reacted with a tris(2-hydroxyethyl) isocyanurate (hereinafter referred to as "THEIC") to produce a polyether resin if the reaction is maintained at an acid pH. This is preferably accomplished by the addition of a mild acid such as butyl acid phosphate to the reaction.

The epoxy resins of this invention are useful in making coating powders, wire enamels, insulating varnish, and various other purposes for which similar epoxy resins are used.

DESCRIPTION OF THE INVENTION

The accompanying drawing is a plot showing the results of an experiment described in Example 6.

The THEIC's of this invention have the general formula

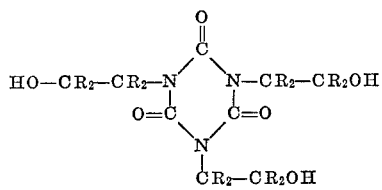

where each R is independently selected from hydrogen and alkyl to $C_4$. Examples include tris(2-hydroxyisopropyl) isocyanurate, 1,3-bis(2-hydroxyethyl)-5-(2-hydroxyisopropyl) isocyanurate, tris(2-hydroxy-t-butyl) isocyanurate, 1-(2-hydroxy - 2 - methyl-t-butyl)-3-(2-hydroxyethyl)-5-(2-hydroxyisopropyl) isocyanurate, etc. Preferably each R in the above general formula is hydrogen (hereinafter "H-THEIC") as this compound is most readily available.

The cyclic 1,2-diepoxide is preferably carbocyclic and as such may be either cycloaliphatic or aromatic; the diglycidyl ether of bisphenol A is preferred because of its ready availability. (Bisphenol A is para, para'-isopropylidenediphenol, $(CH_3)_2C(C_6H_4OH)_2$.) Cycloaliphatic diepoxides may be prepared by the peroxidation of olefins and by various other known techniques. Examples of suitable cycloaliphatic diepoxides include vinyl-cyclohexene dioxide, and dicyclopentadiene dioxide, alicyclic diepoxy adipate, and alicyclic diepoxy carboxylate.

Examples of suitable aromatic diepoxides include N,N-diglycidyl-2,4,6-tribromoaniline, the phenolic adduct of dichloromethyl diphenyl oxide, and low molecular weight resins (i.e. diphenyl-diglycidyl ether monomers which may include up to about 40% oligomers) formed by reacting an epihalohydrin with an aromatic diphenol. The epihalohydrin used may be described by the general formula:

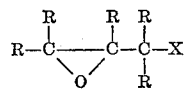

where each R is independently selected from hydrogen and alkyl to $C_4$ and X is halogen; epichlorohydrin is preferred because it is commercially obtainable. Examples of other epihalohydrins within the general formula are epiiodohydrin, 1-chloro-3-methylhydrin, 1-bromo-3,3-dimethylhydrin and 1-fluoro-2-ethylhydrin.

Examples of aromatic diphenols which may be used to form the aromatic diepoxide include hydroquinone,
resorcinol,
2,2-bis(4-hydroxyphenyl)propane,
2,2-bis(4-hydroxyphenyl)pentane,
2,2-bis(4-hydroxyphenyl)phloroglucinol,
2,2-bis(4-hydroxyphenyl)propane,
2,2-bis(4-hydroxyphenyl)methane,
2,2-bis(3-allyl-4-hydroxyphenyl)propane,
2,2-bis(3-isobutyl-4-hydroxyphenyl)pentane, and the like, as well as phenols of the formulae:

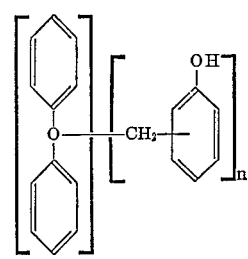

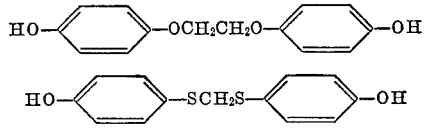

where n=1, 2, 3 or mixtures thereof and preferably n=2.

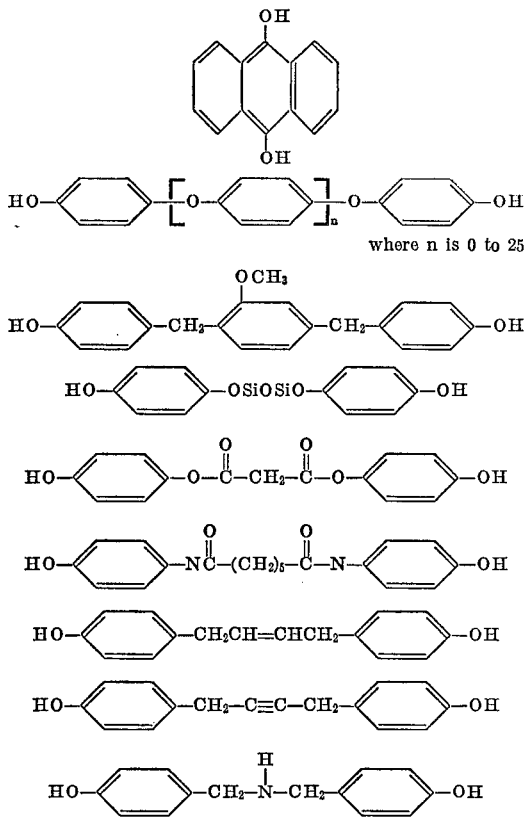

Up to about 5% by weight of a phenol having three or more hydroxyl groups, such as 3,5-dihydroxyphenol, may be used to form the diepoxide in order to decrease the gel time.

The polyether resins of this invention may be prepared from about ½ to about 8 equivalents of a diepoxide per equivalent of THEIC. (An equivalent of a diepoxide in grams is the gram molecular weight of the diepoxide divided by two, and an equivalent of THEIC in grams is the gram molecular weight of THEIC divided by three.) If too much of a diepoxide is used thermal stability is lost and if too much THEIC is used not enough epoxy functionality is left to enable the resin to be adequately cured. An excellent balance of these opposing considerations is obtained by using about 1 to about 3 equivalents of a diepoxide per equivalent of THEIC, and this ratio is therefore preferred.

A diepoxide and a THEIC may be reacted by heating and stirring, at about 160 to 220° C. Temperatures lower than 160° C. tend to unduly prolong the reaction and above 220° C. side reactions may predominate. The reaction is continued until the desired epoxy equivalent weight is obtained which is usually about 1½ to 10 hours.

During the reaction the reactants must be kept acidic or N-substituted 2-oxazolidone will form instead of a polyether resin. However, excess acid should not be used if a high dielectric strength is desired in the resulting resin. The acid pH is preferably obtained by adding a mild organic acid having a pKa of about 0.3 to about 5.0 (determined at 0.1 N) to the reaction either in steps or in a single initial addition. Examples include methyl acid phosphate, dimethyl acid phosphate, phenyl phosphoric acid, naphthalene sulfonic acid, benzosulfonic acid, and butyl acid phosphate ($C_4H_9PO(OH)_2$) which is preferred as it is very compatible with the polyether resins of this invention. If a mild acid is used about 2 to about 5% of acid by weight of the diepoxide and THEIC is generally sufficient to keep the reaction acidic.

Acids which may significantly react with hydroxyl or epoxy groups of the resin such as carboxylic acids or phenols should be avoided as these side reactions deplete the acidity necessary for forming polyethers. However, such acids may be used if the acidity is continually monitored. Strong mineral acids such as hydrochloric, sulfuric, and phosphoric will also prevent the formation of N-substituted 2-oxazolidones but such acids tend to cause charring at the point of addition and thereby use up the acid in side reactions. However, the charring may be avoided to a substantial degree by diluting the acid in a solvent before adding it or by adding it to the diepoxide before a THEIC is added.

After solidifying the polyether resins are generally comminuted by grinding and then dry-blended with a suitable curing agent, such as an anhydride, amine, polyamide, etc. as is well known in the art; they are then cured by heating. Mixtures of diepoxides or THEIC's are also contemplated as being within the scope of this invention. The following examples further illustrate the invention; Examples 1 and 2 are preferred as they worked very well.

Example 1

450 gms. (6 equivalents) of vinyl cyclohexene dioxide, 261 gms. (3 equivalents) of H-THEIC, and 15 gms. butyl acid phosphate were placed in a flask fitted with a thermometer, stirrer, and a sparge tube through which was fed a stream of nitrogen to prevent oxidation. The charge was stirred, heated to 165° C., and checked periodically to be certain that it was acidic. After 10 hours a clear amber resin formed which had an E.E.W. (epoxy equivalent weight) of 1928.

The same experiment was repeated without the presence of the butyl acid phosphate. An exotherm occurred at 130–140° C. and an N-substituted 2-oxazolidone formed.

Example 2

The diepoxide used was a low molecular weight resin of about 85% diglycidyl ether of bisphenol A and about 15% oligomers of bisphenol A and epichlorohydrin. It had an E.E.W. of 180–195 and a viscosity of 10,000 to 16,000 and is sold by Shell Chemical Co. under the trademark "Epon 828." Into a flask equipped as in Example 1 were placed 375 gms. (2 equivalents) of this diepoxide, 261 gms. (3 equivalents) H-THEIC and 15 gms. butyl acid phosphate. The charge was stirred, heated to 165–170° C., and checked periodically for acidity. After 6 hours the reaction was stopped. The product was a clear yellow solid having an E.E.W. of 1090 and a B&R (Ball and Ring melting point) of 75° C.

Example 3

300 gms. (4 equivalents) vinyl cyclohexene dioxide, 87 gms. (1 equivalent) H-THEIC and 3 gms. p-toluene sulfonic acid dissolved in 10 gms. acetone were chaged to a flask equipped as in Example 1. The charge was stirred and heated to 200° C. Samples were taken periodically and although H-THEIC initially separated on cooling, after 45 minutes a clear pill was obtained; heating and stirring were continued for an additional hour. The resulting epoxy resin had a viscosity of W on the Gardner-Holdt scale and an E.E.W. of 146.5. It was cured in 45 minutes at 150° C. with an equal weight of Nadic-methyl-anhydride (the maleic anhydride adduct of methylcyclopentadiene) to form a hard, tough cake.

Example 4

Using the procedure of Example 1, a diepoxide was reacted with H-THEIC using various types and quantities of acid. Table 1 gives the results.

TABLE 1

| Type | Diepoxide Gms. | Equiv. | H-THEIC Gms. | Equiv. | Acid Type | Gms. | Comments |
|---|---|---|---|---|---|---|---|
| Epon 828 | 370 | 2 | 87 | 1 | {H$_2$SO$_4$<br>{H$_2$O | 4.5<br>4.5 | Exotherm did not occur at normal temperature, (about 130° C.) but at 175° C. Exothermed to 240° C.; local charring from acid. |
| Epon 828 | 370 | 2 | 87 | 1 | {H$_2$SO$_4$<br>{H$_2$O | 4.5<br>4.5, | Dimethyl formamide used as solvent. Used 2 extra 5 gm. amounts of H$_2$SO$_4$ in 5 gm. H$_2$O but could not maintain acidity. Abandoned. |
| Epon 828 | 370 | 2 | 87 | 1 | H$_3$PO$_4$ | 10 | I.R. showed no oxazolidone. E.E.W. 307. |
| Epon 828 | 370 | 2 | 87 | 1 | p-Toluene sulfonic acid | 5 | E.E.W. 278 |
| Epirel 510[1] | 370 | 2 | 261 | 3 | Butyl acid phosphate | 10 | Cooked to ∞ E.E.W. B&R=70° C. |
| Epoxide 206 [2] | 300 | 4 | 87 | 1 | {p-Toluene sulfonic acid<br>{Acetone | 3<br>10 | E.E.W. 146.5. |
| Epoxide 206 | 450 | 6 | 261 | 3 | {p-Toluene sulfonic acid<br>{Acetone | 12<br>30 | E.E.W. 186.0, B&R=93° C. Cured with anhydrides and used in a coating powder. |
| Epoxide 206 | 450 | 6 | 201 | 3 | Butyl acid phosphate | 15 | 3 hrs. at 165° C. E.E.W. 505. |
| Epoxide 206 | 375 | 5 | 261 | 3 | Butyl acid phosphate | 15 | E.E.W. 1090, B&R=75° C. |

[1] Trademark of Celanese Corp. for product equivalent to "Epon 828" diepoxide.
[2] Trademark of Union Carbide Co. for vinyl cyclohexene dioxide.

The above table shows that minor amounts of acid were ineffective in producing a polyether, and that only in the third experiment (H$_3$PO$_4$ used) and thereafter where the reaction was maintained at an acid pH was a polyether produced.

Example 5

Into a flask fitted with a thermometer, stirrer, and sparge tube were placed 370 gms. Epon 828 diepoxide (2-equiv.), 261 gms. H-THEIC (3 equiv.) and 15 gms. butyl acid phosphate. The charge was heated and samples were taken periodically. At 185° C. a clear pill was obtained and the reaction was continued at 180° C. The following table summarizes this experiment.

TABLE 2

| Sample No. | Time after reaching 180° C. (hrs.) | E.E.W. |
|---|---|---|
| 1 | 0 | 492 |
| 2 | ½ | 630 |
| 3 | 1 | 844 |
| 4 | 1½ | 1,310 |
| 5 | 2½ | 2,490 |
| 6 | 3½ | 3,580 |
| 7 | 4½ | 14,000 |

Unlike the polyether of the previous experiments, this polyether was made with excess hydroxyl groups on it which made it more useful as an insulating varnish. An epoxy ester was made from this polyether by reacting 500 gms. of the polyether with 330 gms. of linseed fatty acid, cooking to an acid value of 4.2, and cutting in xylol.

This experiment may be repeated using tris(2-hydroxyisopropyl) isocyanurate, 1,3-bis(2-hydroxyethyl)-5-(2-hydroxyisopropyl) isocyanurate, tris(2-hydroxy-t-butyl) isocyanurate, or 1-(2-hydroxy-2-methyl-t-butyl)-3-(2-hydroxyethyl)-5-(2-hydroxyisopropyl) isocyanurate stoichiometrically substituted for H-THEIC.

Example 6

The following compositions were prepared and ground into coating powders:

| | Gms. |
|---|---|
| Composition A: | |
| Polyether resin prepared according to Example 5 with an E.E.W. of 1090, and a B&R of 75° F. | 353.0 |
| Epoxy resin of bisphenol A and epichlorohydrin (E.E.W.=1600 to 2000, viscosity=Y to Z in 40% solution at 25° C., Durran's softening point=127 to 133° C.) sold by Celanese Corp. under the trademark "Epirez 540" | 709.6 |
| Titanium dioxide | 20.2 |
| Cobalt blue | 7.6 |
| Pyromellitic dianhydride | 30.8 |
| Tetrahydrophthalic anhydride | 70.0 |
| Composition B: | |
| "Epirez 540" epoxy resin | 1062.6 |
| Titanium dioxide | 20.2 |
| Cobalt blue | 7.6 |
| Pyromellitic dianhydride | 30.8 |
| Tetrahydrophthalic anhydride | 70.0 |

Using a modified IEEE (Institute of Electrical and Electronic Engineers) test No. 57, two pieces of No. 18 copper were coated with a blend of polymeric amide-imide-ester wire enamel sold under the trademark "Omega" by Westinghouse Electric Corporation (see U.S. Pat. 3,555,113). Two enameled wires for each sample were twisted together, heated to 200 to 250° C. and coated in a fluidized bed of coating powders prepared by melting, cooling, and grinding Compositions A and B.

Ten samples of wire coated with each coating powder were heated in ovens at 225° C., 250° C., and 280° C. Periodically, all the samples were removed from the ovens and 300 volts were passed through the two wires of each sample. The time since being first placed in the ovens was noted for those samples which failed (i.e., shorted) and they were removed from the test. The remaining samples were returned to the ovens and retested again at a later time until they had all failed. The mean average life for each group of samples at 225° C., 250° C. and 280° C., is plotted on the accompanying drawing. The drawing extrapolates the data to lower temperatures and shows the lower limits of IEEE "Class F" (an average life of 40,000 hours at 155° C.) and "Class H" (an average life of 40,000 hours at 180° C.) coating powders. The drawing shows the increase in life which resulted when a polyether of this invention was used to make the coating powder.

I claim:
1. A method of making a polyether resin comprising:
   (A) heating to reaction about ½ to about 8 equivalents of cyclic 1,2-diepoxide with an equivalent of a tris(2-hydroxyethyl) isocyanurate having the general formula

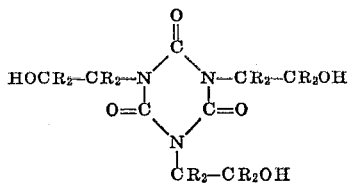

where each R is independently selected from hydrogen and alkyl to $C_4$, and
   (B) maintaining the reaction at an acid pH.
2. A method according to claim 1, wherein each R is hydrogen.
3. A method according to claim 1, wherein said diepoxide is cycloaliphatic or aromatic.
4. A method according to claim 1, wherein an acid pH is maintained by the addition of an organic acid having a pKa of about 0.3 to about 5.0 which does not significantly react with hydroxyl or epoxy groups.
5. A method according to claim 4, wherein said acid is butyl acid phosphate.
6. A method according to claim 4 wherein the amount of said acid is about 2 to about 5% by weight of the amount of said diepoxide and said tris(2-hydroxyethyl) isocyanurate.
7. A method according to claim 3, wherein said diepoxide is the diglycidyl ether of bisphenol A.
8. A method according to claim 1, wherein about 1 to about 3 equivalents of diepoxide are reacted per equivalent of said tris(2-hydroxyethyl) isocyanurate.
9. A method according to claim 1, wherein said diepoxide and said tris(2-hydroxyethyl) isocyanurate are heated to about 160 to about 220° C. for about 1½ to about 10 hours.
10. A method according to claim 1, including the additional steps of comminuating said polyether resin, and dry-blending said comminuated polyether resin with an epoxy curing agent.
11. A method according to claim 10, including the additional step of curing said comminuated and dry-blended polyether resin.
12. A polyether resin made by heating to reaction at an acid pH about ½ to about 8 equivalents of a cyclic 1,2-diepoxide with an equivalent of a tris(2-hydroxyethyl) isocyanurate having the general formula

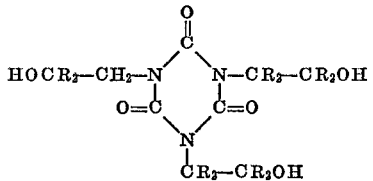

where each R is independently selected from hydrogen and alkyl to $C_4$.
13. A polyether resin according to claim 12, wherein R is hydrogen.
14. A polyether resin according to claim 12, wherein said diepoxide is cycloaliphatic or aromatic.
15. A polyether resin according to claim 14, wherein said diepoxide is the diglycidyl ether of bisphenol A.
16. A polyether resin according to claim 12, wherein there are about 1 to about 3 equivalents of diepoxide per equivalent of tris(2-hydroxyethyl) isocyanurate.
17. A polyether resin according to claim 12 wherein said diepoxide and said tris(2-hydroxyethyl) isocyanurate are heated to about 160 to about 220° C. for about 1½ to about 10 hours.

References Cited
UNITED STATES PATENTS

| | | | |
|---|---|---|---|
| 3,410,854 | 11/1968 | MacGregor et al. | 260—248 NS |
| 3,424,817 | 1/1969 | Hicks | 260—47 |
| 3,293,224 | 12/1966 | Fitz-William, Jr. | 260—77.5 |

WILLIAM H. SHORT, Primary Examiner

T. E. PERTILLA, Assistant Examiner

U.S. Cl. X.R.

117—128.4; 260—2 EP, 18 EP, 47 EA, 77.5 NC, 830 TN